US009738815B2

(12) United States Patent
Luccarelli et al.

(10) Patent No.: US 9,738,815 B2
(45) Date of Patent: Aug. 22, 2017

(54) ULTRA-LOW VOC COMPOSITIONS AND METHODS

(71) Applicants: Charles J Luccarelli, New Canaan, NY (US); Dario Amicucci, Armonk, NY (US); Guy Hanoch Shmuel, Scarsdale, NY (US)

(72) Inventors: Charles J Luccarelli, New Canaan, NY (US); Dario Amicucci, Armonk, NY (US); Guy Hanoch Shmuel, Scarsdale, NY (US)

( * ) Notice: Subject to any disclaimer, the term of this patent is extended or adjusted under 35 U.S.C. 154(b) by 0 days.

(21) Appl. No.: 14/851,889

(22) Filed: Sep. 11, 2015

(65) Prior Publication Data

US 2015/0376456 A1    Dec. 31, 2015

Related U.S. Application Data

(63) Continuation-in-part of application No. 13/923,064, filed on Jun. 20, 2013.

(51) Int. Cl.
| | |
|---|---|
| *C09D 195/00* | (2006.01) |
| *C08K 3/34* | (2006.01) |
| *C08K 3/00* | (2006.01) |
| *C08K 5/00* | (2006.01) |
| *C08J 3/09* | (2006.01) |
| *C08L 95/00* | (2006.01) |

(52) U.S. Cl.
CPC ............ *C09D 195/00* (2013.01); *C08J 3/091* (2013.01); *C08K 3/0008* (2013.01); *C08K 3/346* (2013.01); *C08K 5/0008* (2013.01); *C08L 95/00* (2013.01); *C08J 2395/00* (2013.01)

(58) Field of Classification Search
CPC ..... C08L 95/00; C08L 95/005; C09D 195/00; C10C 3/00; E04D 11/02; D06N 5/00
See application file for complete search history.

(56) References Cited

U.S. PATENT DOCUMENTS

| | | | | |
|---|---|---|---|---|
| 1,658,540 A * | 2/1928 | Sutherland | .............. | C08L 95/00 106/248 |
| 3,407,165 A * | 10/1968 | Loois | .................. | C04B 20/0076 260/998.15 |
| 4,248,926 A * | 2/1981 | Tajima | .................... | B32B 11/02 428/343 |
| 5,529,621 A * | 6/1996 | Hudson | .................. | C08L 95/00 106/278 |
| 5,693,133 A * | 12/1997 | Largent | .................... | C08K 5/17 106/284.06 |
| 6,248,396 B1 | 6/2001 | Helf | | |
| 6,706,787 B1* | 3/2004 | Burris | ................... | C08L 95/005 524/59 |
| 6,764,542 B1* | 7/2004 | Lackey | .................. | C08L 95/00 106/277 |
| 6,786,962 B2* | 9/2004 | Yap | .......................... | C08K 3/34 106/277 |
| 7,238,230 B1* | 7/2007 | Moss | ....................... | C08L 95/00 106/284.02 |
| 8,137,451 B2* | 3/2012 | Aerts | ..................... | C09J 195/00 106/248 |
| 2010/0199886 A1* | 8/2010 | Day | ......................... | C08L 95/00 106/273.1 |
| 2011/0274487 A1* | 11/2011 | Sylvester | ................. | C08L 95/00 404/72 |
| 2015/0376456 A1 | 12/2015 | Luccarelli et al. | | |

FOREIGN PATENT DOCUMENTS

| | | |
|---|---|---|
| KR | 101253524 B1 | 4/2013 |
| WO | 2014204851 A1 | 12/2014 |

OTHER PUBLICATIONS

UK Search Report dated Mar. 15, 2017.

\* cited by examiner

*Primary Examiner* — Matthew E Hoban
*Assistant Examiner* — Alexandra M Moore
(74) *Attorney, Agent, or Firm* — Tarter Krinsky & Drogin LLP

(57) ABSTRACT

The present technology relates to ultra-low VOC compositions comprising asphalt, a softener, clay, a surfactant and one or more polymeric adhesives. The compositions may optionally include functional fibers, fillers and other additives. The present technology also includes methods of manufacturing and using such compositions in coating, sealing, waterproofing and other applications.

25 Claims, No Drawings

ULTRA-LOW VOC COMPOSITIONS AND METHODS

BACKGROUND

The present technology relates to compositions comprising ultra-low levels of volatile organic compounds (VOCs), including those that can be considered VOC-free.

Asphalt-based compositions are used in a variety of construction and building applications. These applications include coating, sealing, waterproofing, joining, cementing, and repairing components such as roofing, walls, footings, and foundations. Such compositions are often referred to as adhesives, cements, mastics, caulking, sealants, primers and coatings.

Asphalt-based compositions are also useful for roofing and waterproofing applications, including the construction or repair of built-up roofs, as saturants used with asphalt roll-roofing, for sealing parapet walls and roof penetrations, and for repairs to and sealing of flashings and gutters. Asphalt compositions can also be used for repair of asphalt shingles, and filling of cracks and nail holes in shingles.

To be commercially useful, such compositions should be durable, easy to apply in a variety of conditions, and relatively inexpensive. Existing asphalt-based roofing and waterproofing compositions are typically sold in tubs or cans (ranging from one gallon to 55 gallons) and in tubes, and can be applied, for example, by hand, via trowel or with a caulk gun dispenser.

There are other specialty applications for asphalt-based compositions, including, for example, joint and crack fillers, waterproofing and damp-proofing applications, and tank and pipeline coatings. Compositions designed for such applications typically have their own set of requirements, and are manufactured to meet different ASTM standards.

Asphalt-based compositions for roofing and waterproofing applications are available in a wide variety of grades, typically for use in different applications, different geographic regions and different temperatures. For built-up roofs, the grade of asphalt is described in ASTM D312 according to the material softening point. Specifically, a Type I roofing asphalt has a low softening point and is considered a soft composition. A Type IV roofing asphalt has a high softening point and is considered a hard composition. These, and intermediate grade compositions, are based on the susceptibility of the asphalt to flow at stated roof temperatures and slopes.

Asphalt-based compositions for roofing and other applications include a solvent to keep the composition soft and pliable, so that it can be readily applied. Once applied, the solvent evaporates, leaving residual asphalt and other ingredients in the compositions. Although the solvents vary depending on the manufacturer, grade, and intended application, existing products employ solvents such as naphtha, kerosene, gasoline, and diesel fuel. These compounds are known as volatile organic compounds (VOCs), which contain carbon and evaporate (become a vapor) or "off-gas" at room temperature. Additional VOC solvents include benzene, xylene, methylene chloride, hexane, toluene, trichloroethane, styrene, heptane, methyl-ethyl ketone, butyl acetate and perchloroethylene. One prevalent VOC composition is known as "mineral spirits" and includes those available under the trade name Varsol™ from ExxonMobil.

For example, EP1811004 to Kelly et al. discloses asphalt-based compositions comprising asphalt, solvent, clay, and a propoxylated alcohol-based ether amine salt surfactant. The disclosed compositions utilize solvents that contain significant amounts of VOCs.

U.S. Pat. No. 7,238,230 to Moss et al. discloses asbestos-free compositions intended for use in roof construction and repair, pavement construction and repair, or as a protective coating for building surfaces. The compositions contain asphalt, clay, a propoxylated alcohol-based ether amine salt surfactant, and solvents that contain significant amounts of VOCs.

U.S. Pat. No. 5,730,791 to Krogh et al. discloses asbestos-free compositions comprising asphalt, solvent, clay, and a hindered acid/amine salt surfactant. The surfactant comprises an acid constituent that has at least two alkyl groups bonded to an alpha carbon and an amine constituent comprising a variety of primary, secondary and tertiary amines. Again, the solvents in the disclosed compositions contain significant amounts of VOCs.

U.S. Pat. No. 8,287,635 to Day et al. discusses asphalt compositions for use in road repair applications. Road repair applications are different from building applications in that the road repair material must be capable of filling large voids in pavement, must form a hard, solidified mass in the void, and must remain stable when subjected to roadway traffic and vehicle loads. Consequently, road repair compositions contain a significant percentage of aggregate. For example, the Examples in the '635 patent comprise more than 50% aggregate–36.5% coarse virgin aggregate, 18% fine virgin aggregate, and 40% reclaimed asphalt pavement ("RAP") that has been graded to coarse aggregate. Generally, road repair compositions, such as the '635 patent compositions, are not acceptable for building applications such as roofing cement, coatings, and water-proofing because they are too heavy and non-uniform. The '635 patent compositions cannot be applied by hand to a building surface with, for example, a trowel or caulk gun. Unlike road patch compositions, for building applications, one desires a material that is pliable enough to produce a smooth surface, that can adhere to vertical surfaces (such as parapet walls and foundations), a material that can seal small cracks and gaps around roof penetrations to prevent water infiltration, and a material that stays pliable over a long period of time under varying weather conditions.

In recent years, there has been widespread concern associated with the use of VOCs, which can cause environmental damage and impact human health. Accordingly, governmental agencies and environmental organizations have sought to limit their use. New regulations have limited the use of VOC containing, solvent-based products.

In response to concerns and regulations governing the use of VOCs, some manufacturers have introduced asphalt-based compositions that employ emulsion technology. Such technology generally involves the use of an emulsifier, which suspends asphalt particles in water or water and oil. Following application, the liquid evaporates leaving the resulting asphaltic composition. Unfortunately, use of water has certain drawbacks and limitations, including that the compositions are susceptible to freezing during storage or in use, resulting in separation of the ingredients and failure of the composition.

Thus, an ongoing need exists for improved compositions that can be described as "ultra-low VOC" that do not employ emulsion-technology. Specifically, there is a need for ultra-low VOC asphalt-based compositions that can provide enhanced performance over known VOC-containing compositions at a reasonable cost; that are environmentally safer than what is currently available; and that are useful for building applications such as roofing applications (including but not limited to roofing and flashing cements, coatings and primers), waterproofing of building foundations and footers, coating of tanks, gutters and pipes; and that can be applied by hand including by trowel or caulk gun; and that exhibit good pliability, workability, flexibility and adhesion, without sagging, slipping or disbanding under a variety of temperatures.

SUMMARY OF THE DISCLOSED TECHNOLOGY

In certain embodiments, the present technology is directed to an ultra-low VOC composition comprising:
(a) asphalt;
(b) a softener;
(c) clay;
(d) a gelling surfactant; and
(e) a polymeric adhesive.

In certain embodiments, the present technology is directed to an ultra-low VOC composition comprising:
(a) about 30% to about 70% asphalt;
(b) about 15% to about 42% of a softener;
(c) about 8% to about 16% clay;
(d) about 1% to about 3% of a gelling surfactant; and
(e) about 1% to about 20% of a polymeric adhesive.

In certain embodiments, the present technology is directed to an ultra-low VOC composition comprising asphalt, a softener, a gelling surfactant, clay and one or more additional ingredients to improve the performance and workability of the composition.

In certain embodiments, the present technology is directed to a method of preparing an asphalt composition, the method comprising the steps of:
(a) mixing asphalt and a softener to form an asphalt cutback;
(b) combining the asphalt cutback with a gelling surfactant and a clay to form a gel; and
(c) adding fibers or a filler to form the composition.

In other embodiments, the present technology is directed to methods of coating a surface, methods of sealing a joint or opening in a surface, methods of protecting a surface from corrosion, and methods of waterproofing a surface with the compositions herein.

DETAILED DESCRIPTION

Different test protocols can be utilized to determine the VOC content of asphalt-based compositions. EPA 24 (U.S. Environmental Protection Agency Technology Transfer Network Emission Measurement Center Method 24) is a useful measure of VOC content in the compositions herein, as it excludes ingredients exempted by regulatory authorities. EPA 24 is an indirect measurement of the VOC content of coatings, wherein the non-volatile content of a coating is determined by drying a known weight of coating and determining the amount of dry film left (this is the non-volatile portion). Next, the volatile fraction of the sample (including water) is determined by subtracting the non-volatile portion from the initial weight of the sample. The amount of water and exempt solvents in the coating are determined, and these values are subtracted from the volatile matter, leaving what is considered to be the amount of VOCs. EPA 24 calculates volatility by converting weight percent loss at the end of 60 minutes at 110° C. in a forced draft oven into VOC content. EPA 24 is based upon ASTM E1868.

The South Coast Air Quality Management District ("SCAQMD") in California has proposed an alternative method for measuring VOC content which entails ambient evaporation for up to six months. See Uyen-Uyen et al., "Non-Volatile, Semi-Volatile, or Volatile: Redefining Volatile for Volatile Organic Compounds"; SCAQMD December 2012. In this methodology, a "volatile" compound is a compound that evaporates more than 95% by weight within six months under ambient evaporation testing conditions. A "semi-volatile" compound is a compound that evaporates between 5% and 95% by weight during the six months under ambient evaporation testing conditions. A "non-volatile" compound is a compound that evaporates less than five percent by weight in six months under ambient evaporation testing conditions.

As used herein, the term "ultra-low VOC" refers to any composition that either: (1) contains very low levels of VOCs when measured according to EPA 24; or (2) meets the definition of a "non-volatile" compound under the SCAQMD evaporation test referred to above. It is important to note that the term "ultra-low VOC" also includes compositions that contain no VOC at all—that is, those that are VOC-free. In various embodiments, the asphalt-based compositions herein have a VOC content of no more than about 3%, no more than about 2%, no more than about 1% or no more than about 0.75% by weight of the overall composition.

As used herein, the term "softener" means a solvent that is ultra-low VOC—that is, it is any substance that dissolves a solute to result in a solution, and either: (1) contains very low levels of VOCs when measured according to EPA 24; or (2) meets the definition of a "non-volatile" compound under the SCAQMD evaporation test referred to above. Useful solvents can comprise, among other ingredients: "bio-oils" or "biodiesels," which include oils derived from plants, including but not limited to soybean, palm, rape seed, canola or algae; or derived from animals such as animal fats; or recycled oils; or man-made oils; or blends of bio-oils. Biodiesels that can be used for the embodiments herein also include esters derived from oils.

As used herein, all percentages expressed are in weight percentages, unless otherwise noted; and refer to absolute percentages in the overall final composition (gel+additional ingredients) unless otherwise noted. For example, when discussing the ratio of asphalt to softener, these ratios refer to the relative amounts of each when combined together in the first step. Table 4 shows each exemplary composition, in horizontal components, grouped by: (a) asphalt+softener+optional polymeric adhesive(s); (b) total cutback (which is (a))+surfactant+clay); and (c) total gel (which is (b))+additional ingredients. Thus, the percentages in Table 4 are based on percentages of each of (I), (II) and (III), and the percentages of each of (I) and (II) in (III) in the final compositions can be mathematically calculated as necessary.

In certain embodiments, the present technology is directed to an ultra-low VOC composition, including but not limited to a building composition such as an asphalt building composition. For example, in accordance with one embodiment, the composition is a roofing cement, foundation cement or flashing cement that comprises asphalt, a softener, clay and a gelling surfactant. The asphalt can be AC-20 (such as Performance Grade 64-22), or another suitable asphalt. In various embodiments, the asphalt and the softener are blended together in a ratio of about 65:35 to about 75:25 or to about 80:20 parts asphalt to parts softener. This blend can then be combined with a surfactant and clay to produce a suitable gel. Additional ingredients can then be added to the gel to produce the final composition, which is workable at ambient temperature. The softener can be comprised of biodiesel, such as biodiesel derived from vegetable plant oils such as soybean oil, and contains little or no VOCs. In certain embodiments, the clay is a medium-swell clay. The compositions can additionally comprise fibers or fillers to enhance the physical properties of the composition, such as strength, thickness, lubricity, and viscosity. In various embodiments, the compositions can additionally comprise one or more wet surface adhesion additives for use in wet conditions (for example, in rain, snow or other precipitation, in high humidity or when the surface to which the composition is being applied is wet), such as those described in ASTM D3409. In various embodiments, the compositions can also additionally comprise one or more polymeric adhesives.

An alternative embodiment of this technology comprises an ultra-low VOC asphalt-based roofing cement or flashing cement composition comprising a mixture of about 65:35 to about 75:25 or to about 80:20 parts asphalt to softener, and a polymeric adhesive. This blend is further mixed with about 11% to about 13.5% clay and about 1.5% to about 2% of a gelling surfactant. The composition can additionally comprise fibers, such as fine or coarse fibers, or a mixture of fine and coarse fibers. The composition can also comprise a functional filler, and a wet surface adhesion additive.

In another embodiment, the present technology contemplates a method of preparing an ultra-low VOC asphalt composition for use in roofing applications, such as a roofing cement or a flashing cement, comprising the following steps: mixing asphalt and the softener with a polymeric adhesive to form a blend. A gelling surfactant and clay are added to the blend, forming a gel. Additionally, if desired, fibers and a functional filler can be added to the gel with further mixing. Further steps can include the addition of a wet surface adhesion additive.

The compositions of the present technology generally exhibit good pliability, workability, flexibility and adhesion, without sagging, slipping, or disbanding under a variety of temperatures. These compositions can be used on a variety of substrates, including roofing materials such as roll roofing, roofing paper, asphalt shingles, galvanized steel, aluminum, painted surfaces, concrete, masonry or brick. They can be used to seal roof penetrations, parapet walls, cracks, seams and joints in roofing materials and flashings, and are useful in waterproofing areas prone to water infiltration, such as foundation walls and footings. In certain embodiments, they can be used for coating surfaces such as tank walls, piping, joints (welds, couplings, threaded connections and seams and the like), and metallic surfaces, to protect them from water and corrosion.

As used herein, the term "building surface" means the outer surface of any part of a building, including a roof, eave or overhang, a roof penetration, such as a skylight or vent, a wall (including a parapet wall), a footing, a foundation, flashing or a gutter. The compositions herein can also be used to protect surfaces of tanks, pipes, heavy machinery and equipment, and other metallic objects.

As used herein, "aggregate" refers to particulate material such as stone, rocks and minerals, crushed slag, gravel and the like, generally having a particle size larger than 5 mm (0.2 inches), as is known on the building and construction arts. Materials that are not "aggregate" generally have a particle size of 5 mm or smaller, and can include (but are not limited to) mineral fillers, rock dust, slag dust, clay, lime, and the other fillers as discussed herein. The present compositions are substantially free of aggregate, meaning that they contain less than 5% aggregate by weight.

As used herein, the term "ambient temperature" means temperatures that are generally expected in outdoor conditions in which human habitation occurs. This range can vary based on the season of the year and the geographic location where the ambient temperatures are measured. For example, in various embodiments, "ambient temperature" means a range of about 0 F to about 120 F (about −17.8 C to about 48.9 C), about 10 F to about 115 F (about −12.2 C to about 46.1 C), about 25 F to about 100 F (about −3.9 C to about 37.8 C), about 32 F to about 95 F (about 0 C to about 35 C), about 40 F to about 90 F (about 4.4 C to about 32.2 C), about 60 F to about 80 F (about 15.6 C to about 26.7 C), or about 68 F to about 86 F (about 20 C to about 30 C) or about 77 F (about 25 C).

The grade of asphalt utilized in the compositions herein, and the amounts of the softener, surfactant and other ingredients, can vary to accommodate the intended use of the compositions, and the weather conditions in the geographic regions in which they will be used. The compositions can also be varied to provide different "seasonal" grades.

Built-up asphalt roofing, modified asphalt roofing and other roofing applications are among the types of roofing commonly used in the United States and worldwide. Such roofs can be repaired with asphalt-based roofing compositions of the present technology, known as flashing cement or roofing cement (also known as plastic roofing cement). These asphalt-containing compositions can also be used on parapet walls, for sealing roof penetrations, for repair of shingles, and for sealing leaks in walls, tanks, gutters and flashing. The present asphalt-containing compositions can also be used for joint and crack filling, as sealants, as cements, and as compounds for waterproofing and dampproofing. Asphalt-compositions can also be used for sealing and waterproofing foundation walls and footers, and in coating and protecting surfaces such as tank walls, pipes, joints, heavy machinery and equipment, and other metallic objects.

The application of asphalt compositions for building applications raises considerations of temperature susceptibility and age hardening. In particular, when the compositions herein are used in building applications, they do not soften unduly at higher temperatures in the summer or crack at lower temperatures in the winter. Moreover, they are able to maintain their properties over many cycles of temperature changes. Additionally, they exhibit age hardening and durability, and do not change in dimension or crack over time. The compositions herein are durable, and resist disintegration under prevailing conditions of weather and exposure to sunlight.

The compositions herein can, in certain embodiments, be manufactured in a variety of different grades, with certain grades for use in northern or colder climates, and other grades of asphalt for use in southern or warmer climates (or northern, warmer climates as is the case in the Southern Hemisphere). The different grades can be achieved using different grades of asphalt, or by varying the type or amount of the softener, the surfactant or the functional fillers or fibers.

The present technology is directed to asphalt-based compositions that can be said to be ultra-low VOC, and which are particularly suited for roofing applications such as plastic roofing cement or flashing cement, and in foundation waterproofing applications. The compositions comprise a mixture of asphalt, a softener, a surfactant, and clay. Fibers and technical or functional fillers can also be added to improve thixotropic properties of the composition. In certain embodiments, one or more polymeric adhesives can be added.

Methods of Preparing or Manufacturing

In certain exemplary and non-limiting embodiments, the technology herein is directed to compositions for building applications such as roofing cement or flashing cement that are manufactured or prepared in three stages:

(1) Blending the Asphalt Cutback—A mixture of asphalt and softener is combined to make the asphalt liquid at room temperature ("room temperature" being about 68 to about 77 F or about 20 to 25 C). The resultant asphalt cutback is ultra-low VOC.

(2) Creating the Gel—To create a gel, a surfactant and clay are added to the asphalt cutback.

(3) Finishing—Fillers or fibers can be used to "finish" the product, in that they add body, improve handling and improve adhesion of the compositions. Certain known roofing cement compositions include use of asbestos fibers; however, in the present technology, the compositions are preferably free of asbestos. In embodiments utilizing cellulose fibers, the surfactant and clay serve to achieve suspension of the fibers and form the gel. In certain embodiments, in addition to the cellulose fibers, the compositions can contain additional ingredients such as rubber or lime or colorants.

Asphalt and Asphalt Cement

Asphalt is the product of the nondestructive distillation of crude oil in petroleum refining. Asphalt is a dark brown to black, cement-like semisolid or solid. Depending on the crude oil used as a feed-stock for the asphalt, the distillation residue can be further processed, typically by air-blowing (sometimes with a catalyst) or solvent precipitation to meet performance specifications for individual applications. Asphalt is typically a mixture of paraffinic and aromatic hydrocarbons and heterocyclic compounds containing sulfur, nitrogen, and oxygen. Asphalts can also be synthesized by alternative means and materials other than petroleum distillation.

Various grades of asphalts can be used with the present technology. These include, for example, asphalts used for paving, blended asphalts, asphaltenes, and recycled asphalts. Suitable asphalts can be air blown or non-air blown. In certain embodiments the grade of asphalt used herein is AC-20 (Performance Grade 64-22 neat).

Asphalts with low asphaltene content will have trouble forming a sufficient gel structure and, as such, the accompanying softener or surfactant may need to be adjusted. Asphalts that are synthesized by means other than petroleum distillation can also be used.

In various embodiments, the asphalt is present in the overall compositions in amounts of about 40 to about 70%, about 41 to about 65% or about 45 to about 55%.

Softener

The compositions herein also include an ultra-low VOC, sustainable, "green" softener that is not petroleum-based. The softener solubilizes the asphalt. Various types and grades of suitable softeners can comprise, but are not limited to, oils known as "bio-oils" or "biodiesels." These bio-oils include oils derived from plants, including but not limited to soybean, palm, rape seed, canola or algae; or derived from animals such as animal fats; or recycled oils; or man-made oils; or blends of bio-oils. Biodiesels that can be used for the embodiments herein also include esters derived from oils.

Different ratios of softener to asphalt can be used within the compositions herein, in certain embodiments producing compositions that conform to ASTM standards. Small quantities of water can also be added to reduce the total amount of softener required, without degrading the performance of the resulting composition. In certain embodiments, the amount of water in the compositions is compliant with ASTM standards (under 3%).

In certain embodiments, the softener comprises biodiesel derived from soy. Typically, the biodiesel is of grade B99 or B100, although other grades can produce satisfactory compositions. The softener can contain, in various embodiments, about 97% or more of biodiesel.

In various embodiments, the softener is present in the overall compositions in amounts of about 15 to about 42%, about 18 to about 40% or about 20 to about 35%.

In various embodiments, the asphalt and softener are blended together to produce the asphalt cutback, in any of the following ratios: about 65:35, about 70:30, about 75:25, about 80:20, or about 68:32.

Surfactant

The compositions herein include a surfactant. In certain embodiments, the surfactant permits the asphaltenes in the compositions herein to bond with the attapulgite clay to form a gel, as discussed below. The likelihood of gel formation depends on the clay to surfactant ratio. Notably, the ratio will vary with the type of clay utilized. Likewise, high asphaltene asphalts generally yield stronger gels.

In certain embodiments, the surfactant can be a salt amine, for example, those having chain lengths of about 12 to about 20 carbons, which are corrosive and with an odor. Suitable surfactants include, but are not limited to: alkyloxyalkylamine salts such as PA-14 acetate (an isodecyloxypropyl amine acetate salt surfactant) sold by Tomah Products, Milton, Wis., and chlorine stable, low foaming, hydrotrope surfactants available under the name "Surtech" from Surface Chemists of Florida (SCF). Alkoxylated fatty amines and alkoxylated ether amines can also be suitable for use as surfactants. Surfactants can also include quaternary ammonium salts such as Arquad 2C-75 and Arquad T-50 from AkzoNobel, and Adogen 3690 sold by Witco Chemical. Other suitable surfactants are available from suppliers such as AkzoNobel; Air Products & Chemicals; Surface Chemists of Florida; BASF; and ArrMaz Chemical.

In various embodiments, the surfactant is present in the overall composition in an amount of about 0.05 to about 3% about 1 to about 2.5% or about 1.7%.

Clay

The compositions herein also include clay, which can form a gel (chemical linkage) with all of, or select fractions of the asphalt, when added to the asphalt/softener/surfactant mixture. The strength of the gel is dependent on the specific quantity and type of asphalt, clay and surfactant utilized in the composition. Gel formation is important to the overall characteristics of the composition, as the gel provides the desired thixotropic properties to the composition. Additional materials, including but not limited to fibers or functional fillers, can be utilized to change the properties of the gel.

It has been noted that the type, grade, and particle size of the clay is important to gel formation in the composition. A clay herein can be a low-swell clay, a medium-swell clay or a high-swell clay. It can also be a mixture of any of these types of clays. For example, clays suitable for use herein include clays having needle shaped forms, such as attapulgite clay, which is also known as Fullers Earth and Cat Litter. Attapulgite clay is a medium-swell clay available from multiple sources, including Min-U-Gel, Millwhite, and Oil Dri Corporation. Attapulgite, a naturally occurring mineral, is a crystalline hydrated magnesium alumino-silicate with a three-dimensional chain structure that gives it unique colloidal and sorptive properties. In certain embodiments, attapulgite clay can be specifically sized after the mining process to provide a small uniform particle size with a large surface area, which can maximize its efficacy to provide improved viscosities. In other embodiments, other clays such as the bentonite, ball, sepiolite or kaolin-type clays can be used. In certain embodiments, mixtures of clays can be used.

In various embodiments, the clay is present in the overall compositions in an amount of about 8 to about 16% or about 9 to about 15%.

Formation of a stable gel structure, with a viscosity that remains generally constant to slightly increasing over time and with composition constituents that remain generally dispersed or homogenous over time, is important to manufacture of suitable compositions in accordance with certain embodiments herein. For roofing applications, it is accepted and recommended that the testing and determination of gel stability be made about four weeks after manufacture.

In certain embodiments, the compositions further comprise a wet surface adhesion agent or additive. Such an ingredient can increase adhesion to wet surfaces, which is a useful property for asphalt-based compositions used as roofing cement or flashing cement. Suitable wet surface adhesion agents or additives include, but are not limited to: hydroxyethyl ethylene urea, amino-methoxysilane, hydroxyl-functional polymeric DCPD polyol, chlorinated polypropylene, polyaminoamide or other amine-based anti-strip additives. The agent or additive can displace water on a damp surface, which permits superior adhesion of the composition to a surface to be coated.

In various embodiments, the wet surface adhesion additive is present in the overall compositions in an amount of about 0.01 to about 2.5%, about 0.1 to about 2.25%, about 0.5%, about 0.99% or about 2%.

In certain embodiments, the composition can include one or more optional fillers. Fillers can provide thixotropic enhancement, build viscosity, improve mechanical properties, such as anti-settling and anti-sag, and can improve stir-back. Examples of suitable fillers include but are not limited to: diatomaceous earth, glass spheres, perlite (treated or untreated), fly ash, mica, and talc; as well as sand, ground slate, ground limestone, wollastonite, pearlite, cellulosic fibers and polyolefin fibers. In certain embodiments, the filler exhibits physical characteristics of uniform particle size and spheroid particle shape, since these characteristics allow the composition to flow while also providing bulk that reduces the weight per unit volume of the finished composition.

In various embodiments, the filler can be functional, where the filler has an effect on the final properties of the product; or non-functional, where the filler is used to bulk-out or extend other ingredients, usually to reduce cost. In addition to those listed above, in certain embodiments, useful non-functional fillers include, but are not limited to: sand and lime dust.

In various embodiments, the filler is present in the overall compositions in an amount of about 0.1 to about 12%, about 0.5 to about 10%, about 1 to about 9% or about 2.5 to about 6.5%.

In certain embodiments, the compositions herein further comprise fibers. These can, in various embodiments, provide film reinforcement, increase tensile strength, elevate temperature flow resistance, build viscosity and provide bulk. In certain embodiments, the fibers interweave in the composition so that when applied to surfaces, the composition stands up and does not slide or sag. Examples of suitable fibers include, but are not limited to: fibers comprising cellulose, fiberglass, mineral, recycled plastic, polypropylene or Armid Kevlar/Pulpex and the like.

Fibers can be selected according to their length, diameter and ability to absorb fluids, so as to provide a final composition having the desired degree of workability and thickness. In certain embodiments, the compositions comprise a combination of fibers, for example, a combination of coarse and fine fibers. The selection of fibers can work synergistically with the selection of the other materials in the composition.

In various embodiments, fine fibers are present in the overall compositions in an amount of about 0.5 to about 10%, about 1 to about 8% or about 1.5 to about 5%. In various embodiments, coarse fibers are present in the overall compositions in an amount of about 0.5 to about 10%, about 1 to about 8% or about 1.5 to about 5%.

Polymeric Adhesive

In certain embodiments, the compositions further comprise one or more polymeric adhesives. Useful polymeric adhesives include, but are not limited to thermoplastics such as rubbers (SBS or SBES), polyamides, polyesters, polycarbonates, thermoplastic polyurethanes, acetalic resins, or polyvinyl esters having the general formula $[RCOOCHCH_2]$—. Included in this category are rubbery synthetic polymers having the formula $(C_4H_6O_2)_n$ and known as polyvinyl acetate (PVA), polyethenyl ethanoate or PVA glue. In certain embodiments, the polymeric adhesive can be in the form of a glue, rubber cement, paste or similar adhesive, or a powdered latex, a liquid latex or a latex emulsion. In certain embodiments, the polymeric adhesive can be added at any step in the methods herein, and combined with any or all of the other ingredients during the process of formation of the compositions.

In certain embodiments, the total polymeric adhesive is present in amounts of about 1 to about 20%, about 1 to about 15%, about 1 to about 10%, about 2 to about 8%, about 2.5 to about 7% or about 3 to about 6% of the compositions herein. In certain embodiments, the compositions herein comprise more than one polymeric adhesive; with the overall amount of polymeric adhesive being in the ranges listed here.

Additional Ingredients

Additional ingredients in the compositions herein can include colorants, aluminum flakes, and other additives that improve adhesion, workability, ductility, and product life. For example, aluminum or other pigments, dyes or paints can be added to the composition to improve composition aesthetics, or for their high reflectivity. Such materials can also provide chemical/corrosion resistance, and improve weather-related performance resistance. Polymers such as SBS, SEBS, neoprene and polyethylene can also be added to improve high and low temperature properties, provide elastic properties, improve weathering properties, and impart chemical resistance.

Other ingredients that can be added include: sawdust, sand, RAP dust, limestone dust or other geological dusts, recycled materials (rubber, printer ink, toner and the like), inert fillers, hardeners, soap, plant or other natural extracts, salt, chlorine, petroleum products such as petrolatum, or waxes.

In certain embodiments, the ranges for the various materials within the compositions of the present technology are those that result in a composition that is ASTM compliant. One of ordinary skill will understand that the content range for any given element of the composition can be adjusted alongside those of other components, so long as the finished composition conforms to applicable ASTM standard. The compositions described in the Examples conform to the current requirements of ASTM D4586, which include: moisture maximum (3%); non-volatile matter minimum (70%); asphalt (35-65%); mineral and other (15-40%); sag resistance at 60° C. (pass/none); and pliability at 0° C. (pass/no cracks).

The compositions of the present technology can result in roofing cements and flashing cements that are environmentally safer than traditional VOC-containing compositions, and are non-toxic in use and afterwards. Further, such compositions are workable at ambient temperatures, easy to apply, and can be stored over a wide range of temperatures. As ultra-low VOC compositions, the compositions herein do not pose a problem with leaking petroleum, or a danger when used on a hot roof. Further, the softeners used herein are much less volatile materials than typical VOC-containing solvents, meaning that they remain malleable over an extended period of time, which is a substantial benefit in roofing applications and the other applications described herein.

EXAMPLE 1

Several prototype compositions were successfully developed. These compositions comprised asphalt in combination with a bio-based softener in ratios that included 65 parts AC-20 (Performance Grade 64-22) and 35 parts bio-based softener; 70 parts AC-20 and 30 parts bio-based softener; and 75 parts AC-20 and 25 parts bio-based softener.

The mixture of asphalt and softener can contain about 65% to about 80% asphalt. In the various compositions here, the asphalt:softener ratio was about 65:35 to about 75:25, or about 70:30. The mixture of asphalt and softener was mixed with about 1.4% to about 1.7% of the surfactant, measured by weight of the final composition. Clay in the amount of about 10.9% to about 13.3% by weight was then slowly added to the mixture, to form a prototype gel.

Following gel formation, coarse fibers, fine fibers and a functional filler were added to the gel, such that the gel comprised about 85% to about 91.1% by weight of the composition, or about 90% by weight of the composition.

The coarse fibers could be added in the amount of about 0.1 to about 5% by weight of the composition, or about 2% by weight of the composition. The fine fibers could be added in the amount of about 0.1 to about 5% by weight of the composition, or about 2% or about 4% by weight of the composition.

The functional filler could be added in the amount of about 0.1 to about 12% by weight of the composition, or about 6% by weight of the composition. In addition, the wet surface adhesion agent could be added in the amount of about 0.5% or about 1% by weight of the composition.

Clay-gels were formed by combining the mixture of AC and softener, with a gelling surfactant and with the clay. Additional ingredients, fibers and functional fillers were added to the gel structure to provide additional body/consistency and fibrous reinforcement for improved performance of the compositions after application. Two compositions were selected for further evaluations described in Table 1 below.

TABLE 1

Compositions

| | | INGREDIENTS (Wt. % (g)) | |
|---|---|---|---|
| | | A | B |
| Gel (II) | Asphalt/Bio-Softener (Cutback (I)) | 85(340 g) | 85(340 g) |
| | Clay | 13.3(53.2 g) | 13.3(53.2 g) |
| | Surfactant | 1.7(6.8 g) | 1.7(6.8 g) |
| Final Composition (III) | Gel (II) | 89(395.6 g) | 89(395.6 g) |
| | Coarse Fiber | — | 2(9 g) |
| | Fine Fiber | 4(17.8 g) | 2(9 g) |
| | Functional Filler | 6(26.7 g) | 6(26.7 g) |
| | Wet Surface Adhesion Additive | 1(4.4 g) | 1(4.4 g) |

Composition A is comprised of 89% (wt.) prototype gel (asphalt, softener, surfactant, clay); 4% fine fiber; 6% functional filler; and 1% wet surface additive.

Composition B is comprised of 89% (wt.) prototype gel (asphalt, softener, surfactant, clay); 2% coarse fiber; 2% fine fiber; 6% functional filler; and 1% wet surface additive.

The two compositions included 70 parts AC-20 and 30 parts bio-based softener. Prior to adding the surfactant, the mixture of the asphalt and the softener was heated to approximately 60-70° C. Using a small Hobart mixer on slow speed, the surfactant was then added to the mixture while paddle agitating. This mixture was mixed/blended for 5 minutes. Next, the clay was slowly added, and a gel was formed by mixing the ingredients for 30+/−5 minutes. The resulting prototype gel was comprised of 59.5% (wt.) of asphalt, 25.5% softener, 13.3% clay; and 1.7% surfactant.

After gel formation, fibers, a functional filler, and a wet surface adhesion additive were added. To 400 g of gel, coarse fibers were slowly added while paddle mixing for 15+/−5 minutes. Fine fibers were slowly added with mixing for 30+/−5 minutes (for Composition B, a mixture of coarse and fine fibers was utilized). A functional filler and an adhesion additive were thereafter added to the composition.

For Compositions A and B, the clay:surfactant ratio was about 8:1. Table 2 shows the properties of these two compositions, 24 hours after preparation.

TABLE 2

Composition Properties at 24 Hours
ASTM D 4586 Requirements

| | A | B |
|---|---|---|
| Sag Test (Behavior at) (D 4586) 60° C. | No sag/no slip | No sag/no slip |
| Pliability (D4586) 0° C. | No cracking (pass) | No cracking (pass) |
| Moisture % (D 95) | 1.9 | 1.7 |
| Workability (D 4586) | Easily spread | Easily spread |
| Other Properties | | |
| Cone Pen, dmm (D 217) 10° C. | 260 | 262 |
| Cone Pen, dmm (D 217) 25° C. | 303 | 318 |
| Cone Pen, dmm (D 217) 60° C. | 330 | 357 |
| Adhesion to Damp, Wet Surfaces (D 6511-17) | 97% (pass) | 98%(pass) |
| VOCs by EPA 24 | 0.58 | 0.28 |
| Weight per Gallon (D 6511-6); lbs/gal | 7.7 | 7.8 |

TABLE 2-continued

Composition Properties at 24 Hours
ASTM D 4586 Requirements

| | A | B |
|---|---|---|
| Outdoor Exposure (1 month) | No slipping, sagging, disbanding; exhibits flexibility | No slipping, sagging, disbanding; exhibits flexibility |
| Adhesion of two shingle pieces | Firm adhesion | Firm adhesion |

ASTM D4586 (Sag Test) provides standard specifications for characteristics of asbestos-free roof cement compositions. These specifications cover two types and two classes of asbestos-free asphalt roof cement consisting of an asphalt base, volatile petroleum solvents, and mineral and/or other stabilizers, mixed to a smooth, uniform consistency suitable for trowel application to roofing and flashing. Type I is made from asphalts characterized as self-healing, adhesive, and ductile and is used for application to essentially dry surfaces. Type II is made from asphalt characterized by high softening point and relatively low ductility, and is used for application to damp, wet, or underwater surfaces. The roof cements must comply with composition limits for water, nonvolatile matter, mineral and/or other stabilizers, and bitumen (asphalt). They must also meet physical requirements such as uniformity, workability, and pliability and behavior at given temperatures. The present embodiments can provide either Type I or Type II asphalts.

As shown in Table 2, both Compositions A and B were tested 24 hours after preparation for their conformity to ASTM D4586 requirements. Both compositions showed no sag and no slip when given a sag test (behavior at 60° C.) (D 4586). Both compositions also showed no cracking when tested for pliability (D 4586) at 0° C. Both compositions were easily spread when tested for workability (D 4586).

Accordingly, Compositions A and B complied with the ASTM D4586 performance properties of $Sag_{60°\,C.}$, Pliability$_{0°\,C.}$, and Workability$_{25°\,C.}$. Compositions A and B showed 1.9% (wt.) water and 1.7% (wt.) water, respectively, when tested for moisture (ASTM D4586-3% maximum allowable moisture). Therefore, these compositions also complied with moisture content requirements of ASTM D4586.

At 24 hours after manufacture, Compositions A and B were observed and appeared smooth, buttery and wet. They exhibited consistency, texture and properties meeting existing industry-accepted standards for VOC containing products. Compositions A and B also exhibited excellent shelf-life, stability and field performance after one-month of exposure.

Cone penetration tests were also used to evaluate the consistency of the compositions over the range of temperatures. These tests measure the relative hardness of a material.

The results are shown in Table 2. The compositions exhibit slightly different viscosity profiles measured over the relevant industry standard expected application and exposure temperatures, about 10 to about 60° C.

Composition A showed 97% adhesion to damp, wet surfaces, while Composition B showed 98% adhesion to damp, wet surfaces. These results meet the requirements of ASTM D6511-17. After one month of outdoor exposure, both compositions showed no slipping, sagging or disbanding, and exhibited flexibility.

Different test protocols can be utilized to determine the VOC content of a material. As mentioned above, under the tests proposed by SCAQMD, a non-volatile compound is defined as a compound that evaporates less than five percent by weight in six months under ambient evaporation testing conditions. Alkyl alkanolamine, methyl palmitate, soy oil and glycerol are all non-limiting examples of non-volatile compounds. As shown in Table 2, using the EPA 24 test, the subject compositions yielded VOC content of 0.58% and 0.28%, respectfully. Such results are considered to be ultra-low VOC.

Both compositions were consistent in stability testing conducted at 1 hour, 24 hours, 1 week and 4 weeks after manufacture, with scores of: Appearance—black; Consistency—thick, smooth and buttery consistency; No separation; and Coning—yes.

Table 3 below shows additional properties measured 4 weeks after manufacture.

TABLE 3

Stability Study

| Properties after 4 weeks | A | B |
|---|---|---|
| Sag Test (Behavior at ((D 4586) 60° C. | No sag/ no slipping | No sag/ no slipping |
| Pliability (D 4586) (0° C.) | No cracking | No cracking |
| Moisture (D 95) % | 1.5 | 1.5 |
| Workability (D 4586) | Easily spread | Easily spread |
| Cone Pen, dmm (D 217) 10° C. | 262 | 256 |
| Cone Pen, dmm (D 217) 25° C. | 300 | 297 |
| Cone Pen, dmm (D 217) 60° C. | 336 | 328 |

As shown in Table 3, testing confirmed that after 4 weeks, the compositions met the requirements of ASTM D4586 and D95 by demonstrating no sag, no slipping, and no cracking and moisture levels of 1.5%. Testing also showed that the compositions were easily spread when tested for workability.

EXAMPLE 2

Additional compositions were prepared as follows, shown in Table 4:

TABLE 4

Additional Compositions

| | Ingredient | C | D | E | F |
|---|---|---|---|---|---|
| Cutback (I) | AC-20 Asphalt (64-22) | 65 to 75% | 65 to 75% | 65 to 75% | 60 to 65% |
| | Softener | 25 to 35% | 25 to 35% | 25 to 35% | 25 to 30% |
| | 1$^{st}$ Polymeric Adhesive | 0 | 0 | 0 | 1 to 10% |
| | 2$^{nd}$ Polymeric Adhesive | 0 | 0 | 0 | 1 to 10% |
| | Cutback Viscosity | 110 to 300 cps | 110 to 300 cps | 110 to 300 cps | 110 to 300 cps |

TABLE 4-continued

Additional Compositions

| | Ingredient | C | D | E | F |
|---|---|---|---|---|---|
| Gel (II) | Total Cutback (I) | 80 to 90% | 80 to 90% | 80 to 90% | 80 to 90% |
| | Surfactant | 1 to 3% | 1 to 3% | 1 to 3% | 1 to 3% |
| | Clay | 10 to 17% | 10 to 17% | 10 to 17% | 10 to 17% |
| Final Composition (III) | Total Gel (II) | 85 to 90% | 85 to 90% | 85 to 95% | 85 to 95% |
| | Coarse Fiber | 0 | 1 to 10% | 1 to 10% | 1 to 10% |
| | Fine Fiber | 1 to 10% | 1 to 10% | 1 to 10% | 1 to 10% |
| | Filler | 0.5 to 10% | 0.5 to 10% | 0.5 to 10% | 0.5 to 10% |
| | Toner | 0 | 0 | 2 to 5% | 0 |

The above compositions were prepared as follows: asphalt and softener were combined to form the cutback material. Optionally, the first or second polymeric adhesives were added to the cutback. The cutback was blended with the surfactant and clay in the percentages set forth (that is, for Compositions C and D, 80 to 90% of the cutback was combined with the surfactant and clay) to prepare the "Total Gel." Similarly, 85 to 90% of the "Total Gel" was then combined with the additional listed components to yield the final composition.

The compositions of Table 4 were tested and showed consistent results in the cone penetration test at 25 C. These compositions also passed the sag test at 62 C and pliability testing at 0 C.

The compositions of Table 4 all passed the appropriate criteria set forth in ASTM D4586 (Standard Specification for Asphalt Roof Cement, Asbestos-Free), D6511 (Standard Test Methods for Solvent Bearing Bituminous Compounds), D312 (Standard Specification for Asphalt Used in Roofing) and D449 (Standard Specification for Asphalt Used in Dampproofing and Waterproofing)

After a full year, the compositions of Table 4 showed no major degradation of the efficacy (longevity criteria). The compositions of Table 4 also look and handle similarly to VOC-containing flashing cements currently in the market (user friendliness criteria). The foregoing results further demonstrate that the compositions herein yield the desirable physical characteristics while maintaining their ultra-low VOC status. Specifically, the compositions all satisfied the D4586 tests for Uniformity, Workability, Behavior (no sagging or sliding) and Pliability at 0 C.

In other embodiments, the present technology contemplates methods of covering a building surface, methods of sealing or waterproofing a building surface or methods of filling a crack, joint or opening in a building surface, comprising applying the compositions herein to the building surface.

In certain embodiments, the present technology includes applying the compositions herein to a foundation wall comprising the steps of:

1) Make sure foundation is thoroughly dry, clean and dust free.

2) Apply the composition to the foundation using a trowel.

3) Inspect area of application to ensure no areas have been missed and that no pores have formed.

4) Optionally, after the composition is applied to a foundation wall, an insulating material or an additional waterproofing barrier can be applied to the composition on the foundation wall, and secured thereto. The insulating material or waterproofing barrier may be in board or roll form, and include materials such as polystyrene boards, PVC sheets and fibrous insulation materials. The materials can be adhered to the composition-coated surface by applying pressure. Thereafter, the foundation may be backfilled, if located below ground level.

In certain embodiments, the present technology includes applying the compositions herein to a metallic surface, to prevent corrosion. Such application can be made to surfaces such as tanks, pipes, joints, and heavy machinery, and includes the steps of: cleaning the surface to be coated, applying the composition to the surface by hand or using a trowel, brush or roller, and inspecting the area of application to ensure no areas have been missed and that no pores have formed. Additional coating may be applied at a later point in time if the material is damaged or worn as a result of use or movement of the object that has been coated.

As discussed, the compositions herein are substantially free of aggregate, and have the distinct advantage of being easily and readily applied to a building surface without the need for industrial or elaborate specialized equipment; for example, the compositions can be applied by hand, or with a trowel, roller, brush, or other similar implement. Thus, the compositions are suitable for industrial, commercial or household use.

Although the present technology has been described in relation to particular embodiments thereof, these embodiments and examples are merely exemplary and not intended to be limiting. It will be apparent to one of ordinary skill in the art that aspects of the technology, as described above, can be implemented in many different forms of compositions, methods and systems, in the implementations illustrated in the present disclosure. The present technology should, therefore, not be limited by the specific disclosure herein, and can be embodied in other forms not explicitly described here, without departing from the spirit thereof.

What is claimed:

1. An ultra-low volatile organic compound composition substantially free of aggregate comprising:
   (a) asphalt;
   (b) a softener;
   (c) clay;
   (d) a gelling surfactant; and
   (e) a polymeric adhesive
wherein the composition meets the following requirements of ASTM D4586, measured 24 hours after manufacture: (i) Workability (ASTM D4586, section 6.2); (ii) Behavior at 60° C. (ASTM D4586, section 6.3); and (iii) Pliability at 0° C. (ASTM D4586, section 6.4) and wherein the VOC content of the composition is less than or equal to about 3% when measured in accordance with EPA 24.

2. The composition of claim 1, further comprising one or more of the following: coarse fibers, fine fibers, a filler, or a wet surface adhesion additive.

3. The composition of claim 1, wherein the polymeric adhesive is a synthetic polymer having the formula $(C_4H_6O_2)_n$.

4. The composition of claim 1, wherein the polymeric adhesive comprises a plurality of polymeric adhesives.

5. The composition of claim 1, wherein the softener comprises biodiesel.

6. The composition of claim 1, wherein the composition further includes a combination of coarse fibers and fine fibers.

7. The composition of claim 1, wherein the composition meets the requirements set forth in ASTM D4586 for Workability (ASTM D4586, section 6.2) and Behavior at 60° C. (ASTM D4586, section 6.3) when measured 4 weeks after manufacture.

8. The composition of claim 1, wherein the composition meets the following requirements of ASTM D4586, 4 weeks after manufacture: (i) Uniformity (ASTM D4586, section 6.1); and (ii) Pliability at 0° C. (ASTM D4586 section 6.4).

9. The composition of claim 1 further comprising about 41% to about 65% asphalt, about 18% to about 40% softener, about 9% to about 15% clay, and about 1% to about 2.5% gelling surfactant and about 1% to about 10% polymeric adhesive.

10. The composition of claim 1 wherein the VOC content of the composition is less than or equal to about 2% when measured in accordance with EPA 24.

11. An ultra-low VOC composition comprising:
    (a) about 30% to about 70% asphalt;
    (b) about 15% to about 42% of a softener;
    (c) about 8% to about 16% clay;
    (d) about 1% to about 3% of a gelling surfactant; and
    (e) about 1% to about 20% of a polymeric adhesive
wherein the composition meets the following requirements of ASTM D4586, measured 24 hours after manufacture: (i) Workability (ASTM D4586, section 6.2); (ii) Behavior at 60° C. (ASTM D4586, section 6.3)); and (iii) Pliability at 0° C. (ASTM D4586, section 6.4) and wherein the VOC content of the composition is less than or equal to about 3% when measured in accordance with EPA 24.

12. The composition of claim 11, wherein the polymeric adhesive is a synthetic polymer having the formula $(C_4H_6O_2)_n$.

13. The composition of claim 11, wherein the polymeric adhesive comprises a plurality of polymeric adhesives.

14. The composition of claim 11, wherein the softener is a biodiesel and the asphalt is AC-20 (Performance Grade 64-22).

15. The composition of claim 11, further comprising about 0.5% to about 10% fine fibers and about 0.5% to about 10% coarse fibers.

16. The composition of claim 11, wherein the composition meets the requirements set forth in ASTM D4586 for Workability (ASTM D4586, section 6.2) and Behavior at 60° C. (ASTM D4586, section 6.3) when measured 4 weeks after manufacture.

17. The composition of claim 11, wherein the composition meets the following requirements of ASTM D4586, 4 weeks after manufacture: (i) Uniformity (ASTM D4586, section 6.1); and (ii) Pliability at 0° C. (ASTM D4586 section 6.4).

18. The composition of claim 11 wherein the VOC content of the composition is less than or equal to about 2% when measured in accordance with EPA 24.

19. A method of coating a building surface, the method comprising applying the composition of claim 1 to the surface with a trowel, roller or caulk gun.

20. The method of claim 19, wherein the building surface is a parapet wall, roof penetration, flashing or gutter.

21. A method of protecting a metallic surface from corrosion, the method comprising applying the composition of claim 1 to the surface.

22. The method of claim 21, wherein the surface is a tank, pipe, joint, or heavy machinery.

23. A method of waterproofing a building surface, the method comprising applying the composition of claim 1 to the building surface.

24. The method of claim 23, wherein the building surface is a foundation or footing.

25. The method of claim 24, further comprising the step of adhering an insulating board to the composition on a foundation.

* * * * *